Sept. 25, 1928.  
G. W. PHILBRICK  
DOG HARNESS  
Filed July 2, 1927

1,685,435

Inventor  
George W. Philbrick  
by Hughes Brown Quinby May  
Attys.

Patented Sept. 25, 1928.

1,685,435

UNITED STATES PATENT OFFICE.

GEORGE W. PHILBRICK, OF WINTHROP, MASSACHUSETTS.

DOG HARNESS.

Application filed July 2, 1927. Serial No. 203,077.

The object of this invention is to provide a harness, whereby a person controlling a dog by a leash is enabled easily to resist the pull exerted thereon by a strong and active dog.

Of the accompanying drawings forming a part of this specification,—

The same reference characters indicate the same parts in all of the figures.

Figure 1:
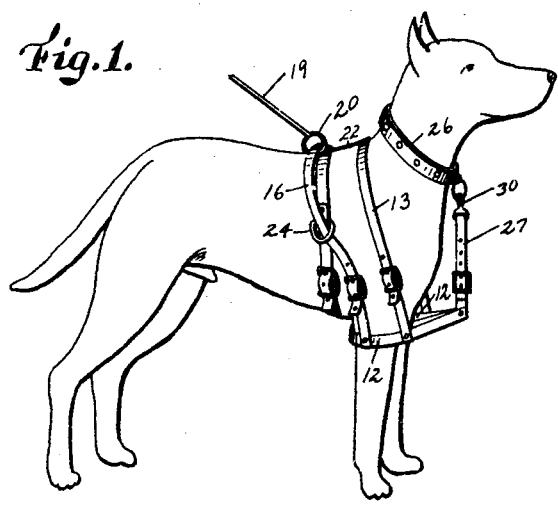
Figure 1 shows in perspective a harness embodying the invention, in place on a dog.

My improved harness comprises a pair of oblong or elliptical leg collars, 12, 12, formed to loosely surround the forward legs of a dog near their junction with the body, each collar being preferably a flexible leather strap joined together at its ends to form a closed oblong loop. A supporting back strap, preferably composed of sections 13 and 13$^a$ adjustably connected by a buckle 14, is attached at its opposite ends, as by rivets 15, to the outer sides of the leg collars, and is formed to extend across the back of the dog and support the collars side by side in close proximity to the body, with their major axes extending lengthwise of the body, and permit endwise movement of the collars on the legs. A leash-engaging pull strap, preferably composed of sections 16 and 16$^a$ adjustably connected by a buckle 17, is attached at its opposite ends, as by rivets 18, to the rear end portions of the leg collars, the midlength portion of the pull strap extending across the dog's back, and having means, such as a ring 20, for engaging a leash 19.

Figure 2:
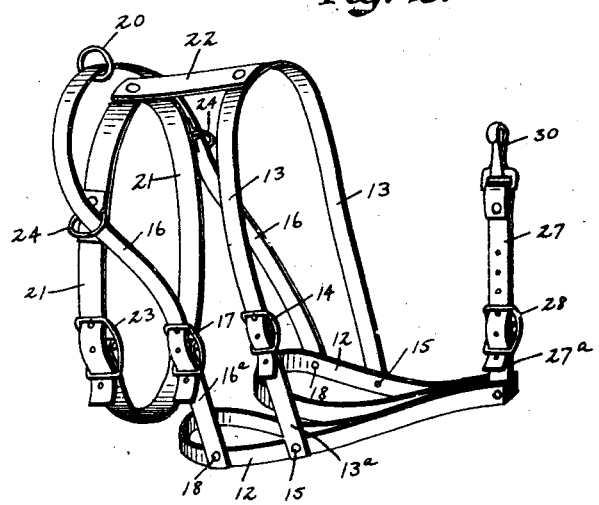
Figure 2 shows in perspective the harness alone.

In the preferred embodiment shown by Figures 1 and 2, the harness includes also a body-embracing surcingle 21, located behind the back strap 13, and connected with the midlength portion thereof by a short strap 22, the surcingle being preferably composed of a strap whose end portions are adjustably connected by a buckle 23. The surcingle is provided with guides 24, through which portions of the pull strap pass loosely. Said guides maintain the pull strap in its operative position when it is loose, so that it will not become objectionably displaced when the dog wearing the harness is running and the leash is not connected.

Figure 3:
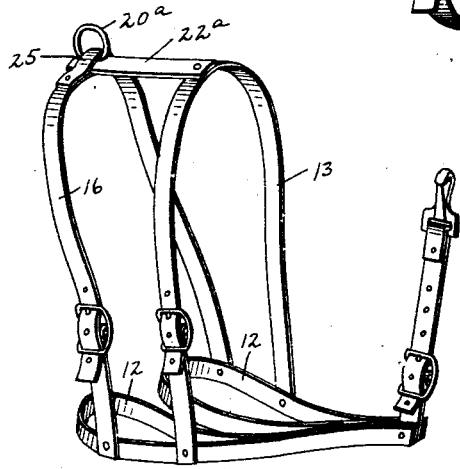
Figure 3 is a view similar to Figure 2, showing a different embodiment of the invention.

In the embodiment shown by Figure 3, the surcingle is omitted and the pull-strap is connected with the midlength portion of the back strap 13 by a short strap 22$^a$ a leash-engaging ring 20$^a$ being connected by a strap 25 with the midlength portion of the pull strap.

When a dog to which the harness is applied is controlled by a leash 19, and exerts a forward pull, the pull strap is tensioned and causes an upward and a rearward pull on the leg collars 12, said collars being pulled upwardly against the body, and at the same time rearwardly, so that their forward ends bear on the the front sides of the fore legs, and restrict movements thereof. The result is that a person holding the leash is enabled to counteract the pull and easily control a strongly pulling dog.

The effectiveness of the control may be increased by connecting the leg collars 12 to the usual neck collar 26. To this end I attach to the forward ends of the collar a vertically extending connecting strap, preferably composed of sections 27 and 27$^a$ adjustably connected by a buckle 28. One end of the connecting strap is attached as by a rivet 29 to the joined-together forward ends of the strap composing the leg collars. The opposite end of the connecting strap may be provided with a snap hook 30, adapted to detachably engage a ring on the neck collar.

A rearward pull exerted by the pull strap on the leg collars is transmitted to the neck collar by the connecting strap, and causes the neck collar to exert a downward pull on the dog's neck and head and oppose upward movement thereof, the restraining effect being thus increased.

The harness may be used with a tether, used to confine a dog in captivity, to prevent the dog from pulling too strongly on the tether.

The connecting strap may be shortened to increase the downward pressure of the collar when the pull strap is tensioned.

Figure 1 shows the position of the harness when the pull strap is loose, the elongation of the loosely hanging leg collars permitting the dog to run freely when the leash is disconnected. When the dog pulls and the leash is connected and held, the pull strap 16 is tensioned and exerts a rearward pull on the leg collars, so that the forward ends of said collars are pressed closely against the forward sides of the front legs, and restrain forward movements of the legs.

I claim:

1. A dog harness comprising a pair of oblong collars, formed to loosely surround the fore legs of a dog and move lengthwise thereon; means for supporting the collars side by side in close proximity to the body and permitting endwise movement of the collars on the legs, said means including a back strap extending across the back and attached at its ends to the outer side portions of the collars; and a pull strap attached at its ends to the rear portions of the collars, extending loosely across the back, and provided with means for engaging a leash, the arrangement being such that when the leash is loose, or detached, the collars hang loosely and permit free movements of the fore legs, and when the leash is attached and held, the pull strap may be tensioned by a pulling dog, so that the collars are drawn rearwardly against the front sides of the fore legs to impede movements thereof.

2. In combination, a neck collar, and a dog harness comprising a pair of oblong leg collars, formed to loosely surround the fore legs of a door, and move lengthwise thereon; means for supporting the leg collars side by side, in close proximity to the under side of the body, and permitting endwise movement thereof lengthwise of the body, said means including a back strap extending across the dog's back and secured at its ends to side portions of the collars; a vertically extending connecting strap detachably connected at its upper end with the collar and, attached at its lower end to the forward ends of the leg collars; and a pull strap attached at its ends to the rear portions of the leg collars, extending loosely across the back, and provided with means for engaging a leash, the arrangement being such that when the leash is loose, or detached, the leg collars hang loosely and permit free movements of the fore legs, and when the leash is attached and held, the pull strap may be tensioned by a pulling dog, so that the leg collars are drawn rearward against the front sides of the legs, to impede movements thereof, and the neck collar is pulled downward against the back of the neck.

3. A dog harness comprising a pair of oblong collars, formed to loosely surround the fore legs of a dog and move lengthwise thereon; means for supporting the collars side by side in close proximity to the body and permitting endwise movement of the collars on the legs, said means including a back strap extending across the back and attached at its ends to the outer side portions of the collars; and a pull strap attached at its ends to the rear portions of the collars, extending loosely across the back, and provided with means for engaging a leash, the arrangement being such that when the leash is loose, or detached, the collars hang loosely and permit free movements of the fore legs, and when the leash is attached and held, the pull strap may be tensioned by a pulling dog, so that the collars are drawn rearwardly against the front sides of the fore legs to impede movements thereof, the harness comprising also a surcingle adapted to be closed around the body, a connection between the upper portions of the surcingle and back strap, and pull-strap guides on the opposite side portions of the surcingle, and arranged to maintain the pull strap in position for use.

4. A dog harness as specified by claim 2, the leg collars being composed of two flexible straps, the ends of which are joined to form closed loops, the connecting strap being fixed to the joined ends of the loop-forming straps.

In testimony whereof I have affixed my signature.

GEORGE W. PHILBRICK.